United States Patent
Neilson et al.

(10) Patent No.: US 11,891,464 B2
(45) Date of Patent: Feb. 6, 2024

(54) ALKANE-SOLUBLE NON-METALLOCENE PRECATALYSTS

(71) Applicant: Dow Global Technologies LLC, Midland, MI (US)

(72) Inventors: Bethany M. Neilson, Manvel, TX (US); Roger L. Kuhlman, Lake Jackson, TX (US); Ian M. Munro, Lake Jackson, TX (US); John F. Szul, Hurricane, WV (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 502 days.

(21) Appl. No.: 17/279,243

(22) PCT Filed: Oct. 11, 2019

(86) PCT No.: PCT/US2019/055878
§ 371 (c)(1),
(2) Date: Mar. 24, 2021

(87) PCT Pub. No.: WO2020/096732
PCT Pub. Date: May 14, 2020

(65) Prior Publication Data
US 2022/0049032 A1    Feb. 17, 2022

Related U.S. Application Data

(60) Provisional application No. 62/756,237, filed on Nov. 6, 2018.

(51) Int. Cl.
C08F 210/16 (2006.01)
B01J 8/24 (2006.01)
C07F 7/00 (2006.01)

(52) U.S. Cl.
CPC ............. *C08F 210/16* (2013.01); *B01J 8/24* (2013.01); *C07F 7/003* (2013.01)

(58) Field of Classification Search
CPC ............ C08F 210/16; B01J 8/24; C07F 7/003
See application file for complete search history.

(56) References Cited

U.S. PATENT DOCUMENTS

| 3,709,853 A | 1/1973 | Karapinka |
| 4,003,712 A | 1/1977 | Miller |

(Continued)

FOREIGN PATENT DOCUMENTS

| EP | 0279586 | 8/1988 |
| EP | 0511665 | 11/1992 |

(Continued)

OTHER PUBLICATIONS

Office Action from corresponding Japanese Application No. 2021-520342 dated Oct. 11, 2023.

(Continued)

*Primary Examiner* — Catherine S Branch

(57) ABSTRACT

A compound of formula (1) as drawn in the description, wherein M is a Group 4 metal, one R is a silicon-containing organic solubilizing group, and the other R is a silicon-containing organic solubilizing group or a silicon-free organic solubilizing group. A method of synthesizing the compound (1). A solution of compound (1) in alkane solvent. A catalyst system comprising or made from compound (1) and an activator. A method of polymerizing an olefin monomer with the catalyst system.

15 Claims, 1 Drawing Sheet

(56) References Cited

U.S. PATENT DOCUMENTS

| | | |
|---|---|---|
| 4,011,382 A | 3/1977 | Levine et al. |
| 4,302,566 A | 11/1981 | Karol et al. |
| 4,453,399 A | 6/1984 | Thompson |
| 4,543,399 A | 9/1985 | Jenkins, III et al. |
| 4,588,790 A | 5/1986 | Jenkins, III et al. |
| 4,665,208 A | 5/1987 | Welborn, Jr. et al. |
| 4,874,734 A | 10/1989 | Kioka et al. |
| 4,882,400 A | 11/1989 | Dumain et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 4,988,783 A | 1/1991 | Beran et al. |
| 4,994,534 A | 2/1991 | Rhee et al. |
| 5,041,584 A | 8/1991 | Crapo et al. |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,318,935 A | 6/1994 | Canich et al. |
| 5,329,032 A | 7/1994 | Tran et al. |
| 5,352,749 A | 10/1994 | DeChellis et al. |
| 5,462,999 A | 10/1995 | Griffin et al. |
| 5,473,202 A | 12/1995 | Mudge et al. |
| 5,506,184 A | 4/1996 | Kissin et al. |
| 5,541,270 A | 7/1996 | Chinh et al. |
| 5,627,242 A | 5/1997 | Jacobsen et al. |
| 5,648,310 A | 7/1997 | Wasserman et al. |
| 5,665,818 A | 9/1997 | Tilston et al. |
| 5,677,375 A | 10/1997 | Rifi et al. |
| 5,688,880 A | 11/1997 | Spencer et al. |
| 5,770,755 A | 6/1998 | Schertl et al. |
| 5,889,128 A | 3/1999 | Schrock et al. |
| 5,965,477 A | 10/1999 | Sivaram et al. |
| 5,972,510 A | 10/1999 | O'Hare et al. |
| 6,034,187 A | 3/2000 | Maehama et al. |
| 6,255,419 B1 | 7/2001 | Imuta et al. |
| 6,274,684 B1 | 8/2001 | Loveday et al. |
| 6,489,408 B2 | 12/2002 | Mawson et al. |
| 6,534,604 B2 | 3/2003 | Loveday et al. |
| 6,841,631 B2 | 1/2005 | Loveday et al. |
| 6,858,684 B2 | 2/2005 | Burdett et al. |
| 6,894,128 B2 | 5/2005 | Loveday et al. |
| 6,949,612 B2 | 9/2005 | Agapiou et al. |
| 6,967,184 B2 | 11/2005 | Wenzel et al. |
| 6,995,217 B2 | 2/2006 | Agapiou et al. |
| 7,163,991 B2 | 1/2007 | Wenzel et al. |
| 7,196,032 B2 | 3/2007 | Wenzel et al. |
| 7,276,566 B2 | 10/2007 | Muruganandam et al. |
| 7,479,529 B2 | 1/2009 | Wenzel et al. |
| 7,566,677 B2 | 7/2009 | Muruganandam et al. |
| 7,718,566 B2 | 5/2010 | Wenzel et al. |
| 7,754,840 B2 | 7/2010 | Loveday et al. |
| 7,873,112 B2 | 1/2011 | Nakamura |
| 7,964,680 B2 | 6/2011 | Choi et al. |
| 7,973,112 B2 | 7/2011 | Muruganandam et al. |
| 7,981,984 B2 | 7/2011 | Jiang et al. |
| 8,291,115 B2 | 10/2012 | Bitterlich |
| 9,234,060 B2 | 1/2016 | Kao et al. |
| 9,902,790 B2 | 2/2018 | Vanderlende et al. |
| 2005/0182210 A1 | 8/2005 | Muruganandam et al. |
| 2005/0182212 A1 | 8/2005 | Wenzel et al. |
| 2006/0173123 A1 | 8/2006 | Yang et al. |
| 2011/0207599 A1 | 8/2011 | Johns |
| 2016/0032025 A1 | 2/2016 | Giesbrecht |
| 2018/0002464 A1 | 1/2018 | Fontaine et al. |
| 2018/0079836 A1 | 3/2018 | Locklear et al. |
| 2018/0118862 A1 | 5/2018 | Savatsky et al. |

FOREIGN PATENT DOCUMENTS

| | | |
|---|---|---|
| EP | 0561476 | 9/1993 |
| EP | 0594218 | 4/1994 |
| EP | 0634421 | 1/1995 |
| EP | 0649992 | 4/1995 |
| EP | 0767184 | 4/1997 |
| EP | 0794200 | 9/1997 |
| EP | 0802202 | 10/1997 |
| EP | 0802203 | 10/1997 |
| NO | 199950311 | 10/1999 |
| WO | 1994/10180 | 5/1994 |
| WO | 199947598 | 9/1999 |
| WO | 199948605 | 9/1999 |
| WO | 199960033 | 11/1999 |
| WO | 2000024793 | 5/2000 |
| WO | 2010008964 | 1/2010 |
| WO | 2011087520 | 7/2011 |
| WO | 2018147968 | 8/2018 |

OTHER PUBLICATIONS

Liang, "Synthesis of Group 4 Complexes that Contain the Diamidoamine Ligands, [(2,4,6-Me3C6H2NCH2CH2)2NR] 2-([Mes2N2NR]2-; R=H or CH3), and Polymerization of 1-Hexene by Activated [Mes2N2NR]ZrMe2 Complexes", J. Am. Chem. Soc., 1999, p. 5797-5798, vol. 121.

Schrock, "Preparation and Activation of Complexes of the Type [((mesityl) NCH2CH2)2NX]ZrME2 (X=H, Me) with [Ph3C][B(C6F5)4] or [PhNMe2H][B(C6F5)4]", Organometallics, 2000, p. 5325-5341, vol. 19.

PCT/US2019/055878, International Search Report and Written Opinion dated Feb. 7, 2020.

Schrock, "Cationic Zirconium Complexes that Contain Mesityl-Substituted Diamido/Donor Ligands. Decomposition via CH Activation and Its Influence on 1-Hexene Polymerization", Organometallics, 2001, p. 3560-3573, vol. 20.

Gibson and Spitzmesser, Chem. Rev., 2003, pp. 283-315.

Frederic Guerin, "Synthesis, Structure, and Reactivity of Zirconium Alkyl Complexes Bearing Ancillary Pyridine Diamide Ligands", American Chemical Society, 1998, vol. 17, pp. 5172-5177.

Office Action from corresponding Chinese Application No. 201980065960.7 dated Nov. 15.

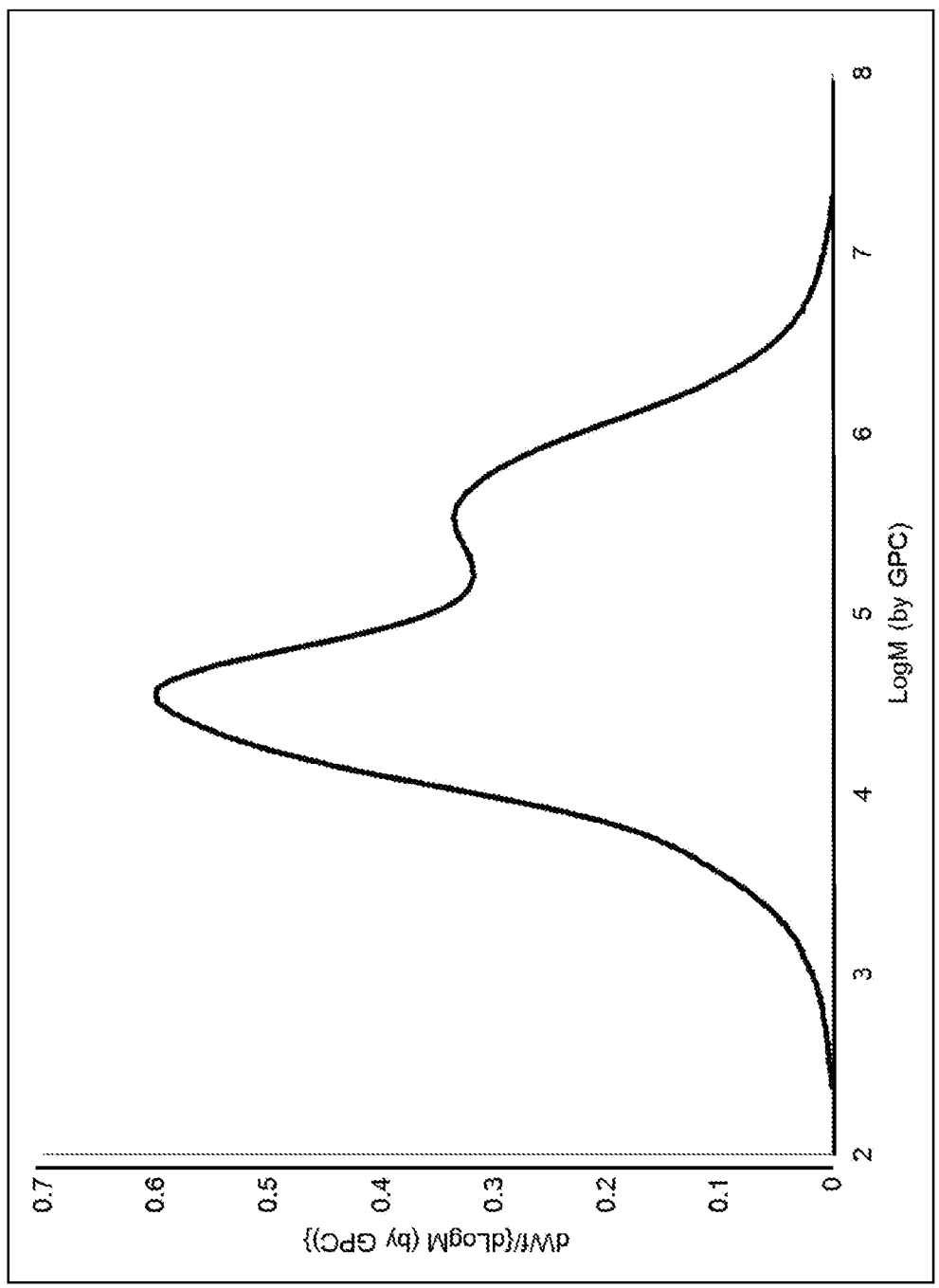

ALKANE-SOLUBLE NON-METALLOCENE PRECATALYSTS

FIELD

Organometallic compounds, catalysts, synthesis, and olefin polymerization.

Publications and patents in or about the field include US20050182210A1; U.S. Pat. Nos. 5,318,935; 5,506,184; 5,889,128; 6,255,419B1; 6,274,684B1; 6,534,604B2; 6,841,631 B2; 6,894,128B2; 6,967,184B2; 7,163,991B2; 7,196,032B2; 7,276,566B2; 7,479,529B2; 7,566,677B2; 7,718,566B2; 7,754,840B2; 7,973,112B2; and 9,902,790B2. U.S. Pat. No. 6,967,184B2 mentions synthesis of HN5Zr (NMe$_2$)$_2$. U.S. Pat. No. 7,973,112B2 mentions a spray-dried catalyst containing bis(phenylmethyl)[N'-(2,3,4,5,6-pentamethylphenyl)-N-[2-(2,3,4,5,6-pentamethylphenyl)amino-κN]ethyl]-1,2-ethane-diaminato(2-)κN,κN']zirconium or "HN5Zr", abbreviated herein as "HN5Zr dibenzyl" and (n-propylcyclopentadienyl) (tetramethylcyclopentadienyl)zirconium dichloride.

INTRODUCTION

We describe solutions to one or more problems relating to transition complexity and stability of a catalyst system that comprises, or is made from, a metallocene (MCN) precatalyst, a non-metallocene precatalyst that is insoluble in alkanes ("insoluble non-MCN" precatalyst), at least one activator, and a support material (solid). The insoluble non-MCN precatalyst (e.g., HN5Zr dibenzyl) makes a higher molecular weight (HMW) polyethylene component of a bimodal polyethylene composition. The MCN precatalyst is soluble in alkanes and makes a lower molecular weight (LMW) polyethylene component of the bimodal polyethylene composition. The catalyst system is formulated in two parts. A first part comprises a slurry of the support, an alkanes solvent, the at least one activator, all of the insoluble non-MCN precatalyst (e.g., HN5Zr dibenzyl), and some of the MCN precatalyst. A second part comprises a solution of the remainder of the MCN precatalyst in an alkane(s) solvent, but none of the insoluble non-MCN precatalyst, activator, or support.

In a "combining-the-parts" feed method, the first and second parts are fed separately into an in-line mixer, where they mix to make the catalyst system. This fresh catalyst system is fed into a single polymerization reactor. The combining-the-parts feed method has some flexibility to achieve various polymerization rates and to enable making various bimodal polyethylene compositions with various polymer attributes in the single polymerization reactor. For example, the flow rate of the feed of the second part may be adjusted to supplement the effect of the portion of the MCN precatalyst in the first part (e.g., make more of the LMW polyethylene component), or to "trim" or modulate the effects of the insoluble non-MCN precatalyst (e.g., HN5Zr dibenzyl) of the first part (e.g., increase the LMW/HMW ratio), enabling making various bimodal polyethylene compositions. Thus, the second part is called a "trim catalyst". The combining-the-parts feed method allows control within limits of the polymerization reaction making the bimodal polyethylene composition and varying within limits of the LMW/HMW ratio so as to transition between various bimodal polyethylene compositions in the single polymerization reactor.

The first part beneficially contains all of the insoluble non-MCN precatalyst, activator, and some of the MCN precatalyst, and is pre-mixed with a desired amount of the second part (trim catalyst) to make a bimodal catalyst system before it enters a polymerization reactor. This is done in order to make a so-called reactor blend of the HMW and LMW polyethylene components in the polymerization reactor, whereby the HMW and LMW polyethylene components are made in situ in intimate contact with each other. This reactor blend results in a bimodal polyethylene composition having better mixing of the HMW and LMW polyethylene components, and thus a decreased gel content. If the insoluble non-MCN precatalyst and activator and the MCN precatalyst and activator would be fed separately into the polymerization reactor, the resulting HMW and LMW polyethylene components would be initially made separately in the reactor, and may not homogeneously mix together thereafter. This may make a comparative bimodal polyethylene composition undesirably having increased gel content, where portions of the HMW polyethylene component may make gels. The comparative bimodal polyethylene composition may have a gel content that is too high for applications requiring clarity such as films and/or for applications requiring high strength such as pipes.

Unfortunately the HMW/LMW ratio in the combining-the-parts feed method cannot be zero or near zero because the first part of the catalyst system contains both the MCN precatalyst and the insoluble non-MCN precatalyst (e.g., HN5Zr dibenzyl), and therefore the bimodal polyethylene composition made thereby always contains some amount of both the LMW polyethylene component and the HMW polyethylene component.

Further, transitions between insoluble non-MCN precatalyst (e.g., HN5Zr dibenzyl) and a different precatalyst or between different amounts of insoluble non-MCN precatalyst ("catalyst transitions") in the single polymerization reactor are complex. For example, it is complex to transition from a first catalyst system (abbreviated LMW-CAT-1, insoluble non-MCN precatalyst) to a second catalyst system (abbreviated LMW-CAT-2, insoluble non-MCN precatalyst), wherein LMW-CAT-1 and LMW-CAT-2 are different from each other and from insoluble non-MCN precatalyst. Even though the insoluble non-MCN precatalyst is the same in the first parts of both the first and second catalyst systems, both the first and second parts of the first catalyst system must be replaced for the transition because both the first and second parts contain the no longer wanted LMW-CAT-1 component.

Also, certain insoluble non-MCN precatalyst (e.g., HN5Zr dibenzyl) become unstable after being mixed with the activator. It is necessary to chill those first parts (containing unstable/insoluble non-MCN precatalyst) of the catalyst system to about −10 degrees Celsius (° C.) for shipment or storage thereof. Then, the second part may need to be reformulated to withstand cooling "shock" when it contacts the chilled first part in the in-line mixer. Or the first part may need to be warmed before being fed into the in-line mixer.

And because insoluble non-MCN precatalyst (e.g., HN5Zr dibenzyl) is insoluble in alkanes, it is not suitable for use in the second part (trim catalyst) in the combining-the-parts feed method.

SUMMARY

A compound of formula (1):

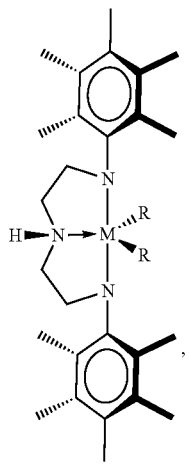

(1)

wherein M is a Group 4 metal, one R is a silicon-containing organic solubilizing group, and the other R is a silicon-containing organic solubilizing group or a silicon-free organic solubilizing group.

A method of synthesizing the compound of formula (1) as described below.

A solution of compound (1) in alkane solvent.

A catalyst system comprising or made from compound (1) and an activator.

A method of polymerizing an olefin monomer with the catalyst system.

The compound (1) may be contacted with an activator to make a catalyst, which is useful for polymerizing one or more olefin monomers to make a corresponding polyolefin.

BRIEF DESCRIPTION OF THE DRAWINGS

FIG. 1 is a Gel Permeation Chromatogram (GPC) of a bimodal polyethylene composition made according to the method of Example 9.

DETAILED DESCRIPTION

The Summary, Claims, and Abstract are incorporated here by reference. Certain embodiments are described below as numbered aspects for easy cross-referencing. Embodiments of the invention provide a new non-MCN precatalyst composition, which has at least one silicon-containing organic solubilizing group. The composition beneficially has a significantly increased solubility in alkanes and/or a significantly increased catalyst light-off, both compared to those of HN5Zr dibenzyl.

Aspect 1. A compound of formula (1), as drawn above, wherein M is Zr or Hf; one R independently is an unsubstituted or substituted quaternary-silahydrocarbyl group; and the other R is an unsubstituted or substituted quaternary-silahydrocarbyl group or an unsubstituted or substituted (aryl)alkyl group. Each R group is free of a cyclopentadienyl group, a carbon-carbon double bond, and a carbon-carbon triple bond. Each substituent of the substituted quaternary-silahydrocarbyl group or substituted (aryl)alkyl group independently may be selected from unsubstituted $(C_1-C_5)$alkyl, halogen, —Oalkyl, —N(alkyl)$_2$, and —Si(alkyl)$_3$. In some aspects there is only one substituent per substituted group.

In some aspects one R is an unsubstituted or substituted quaternary-silahydrocarbyl group and the other R is the unsubstituted or substituted (aryl)alkyl group. Each unsubstituted (aryl)alkyl group is an unsubstituted $(C_7-C_8)$arylalkyl group or an unsubstituted $(C_1-C_{15})$alkyl group. In some aspects the (aryl)alkyl group is a quaternary-(aryl)alkyl group, which contains a carbon atom bonded to four other carbon atoms.

In some aspects each R independently is an unsubstituted or substituted quaternary-silahydrocarbyl group. Each quaternary-silahydrocarbyl group contains a quaternary silicon atom and a $(C_1-C_3)$alkylene or $(C_7-C_8)$arylalkylene, alternatively $(C_1-C_3)$alkylene, alternatively $(C_7-C_8)$arylalkylene, alternatively a $(C_1-C_2)$hydrocarbylene. The $(C_1-C_3)$alkylene or $(C_7-C_8)$arylalkylene is disposed between the quaternary silicon atom and the metal M. Thus, the quaternary silicon atom is bonded indirectly to the metal M via the $(C_1-C_3)$ alkylene or $(C_7-C_8)$arylalkylene (e.g., benzylene), which in turn is bonded to the metal M (e.g., M-CH$_2$-phenylene-). A quaternary silicon atom is an element having atomic number 14 in the Periodic Table of the Elements that is bonded to four carbon atoms, one of which is a carbon atom of the $(C_1-C_3)$alkylene or $(C_7-C_8)$arylalkylene.

Aspect 2. The compound of aspect 1 wherein at least one, alternatively each R independently is an unsubstituted or substituted quaternary-silahydrocarbyl group of formula —(C(R$^A$)$_2$)$_m$QSiR$^1$R$^2$R$^3$, wherein subscript m is 1, 2, or 3; wherein each R$^A$ independently is H or $(C_1-C_3)$alkyl or each R$^A$ is bonded together as R$^{A'}$-R$^{A'}$, wherein R$^{A'}$-R$^{A'}$ is a $(C_1-C_3)$alkylene; each Q independently is absent, a $(C_1-C_3)$ alkylene, or an unsubstituted or substituted phenylene; wherein each R$^1$, R$^2$, and R$^3$ is independently a $(C_1-C_{15})$ alkyl that independently is unsubstituted or substituted with one or more substituents; and wherein each substituent independently is selected from unsubstituted $(C_1-C_5)$alkyl, halogen, —Oalkyl, —N(alkyl)$_2$, and —Si(alkyl)$_3$. In some aspects, with the proviso that when subscript m is 2, the resulting (C(R$^A$)$_2$)$_m$ is not C(R$^A$)$_2$CH(R$^A$) or C(R$^A$)$_2$CH$_2$; and when subscript m is 3, the resulting (C(R$^A$)$_2$)$_m$ is not C(R$^A$)$_2$CH(R$^A$)C(R$^A$)$_2$ or C(R$^A$)$_2$CH$_2$C(R$^A$)$_2$. The optional proviso is intended to exclude compounds that may be prone to undergoing beta-hydride elimination. In some aspects subscript m is 2, alternatively 1. In some aspects each R$^A$ independently is H or unsubstituted $(C_1-C_4)$alkyl, alternatively H or methyl, alternatively H. In some aspects each Q is absent. In some aspects at least one, alternatively each Q is present. When each Q is present, each Q independently may be a $(C_1-C_3)$alkylene, alternatively CH$_2$, alternatively CH$_2$CH$_2$, alternatively CH$_2$CH$_2$CH$_2$, alternatively CH$_2$CH (CH$_3$). Alternatively each Q independently may be unsubstituted 1,4-phenylene, unsubstituted 1,3-phenylene, or unsubstituted 1,2-phenylene; alternatively selected from any two of unsubstituted 1,4-, 1,3-, and 1,2-phenylene; alternatively unsubstituted 1,2-phenylene; alternatively unsubstituted 1,3-phenylene; alternatively unsubstituted 1,4-phenylene. The 1,2-phenylene is benzene-1,2-diyl; the 1,3-phenylene is benzene-1,3-diyl and the 1,4-phenylene is benzene-1,4-diyl. The "unsubstituted phenylene" means the phenylene is of formula C$_6$H$_4$. In some aspects each quaternary-silahydrocarbyl group is unsubstituted.

Aspect 3. The compound of aspect 1 or 2 wherein at least one, alternatively each R is independently —CH$_2$SiR$^1$R$^2$R$^3$; wherein each R$^1$, R$^2$, and R$^3$ is independently unsubstituted $(C_1-C_{15})$alkyl, alternatively $(C_1-C_3)$alkyl, alternatively methyl. In some aspects one R is the —CH$_2$SiR$^1$R$^2$R$^3$ and the other R is unsubstituted (C$_1$-C$_{15}$)alkyl.

Aspect 4. The compound of aspect 1, 2, or 3 wherein at least one, alternatively each R is —CH$_2$-(unsubstituted phenylene)-SiR$^1$R$^2$R$^3$; wherein each unsubstituted phenylene is unsubstituted 1,4-phenylene, unsubstituted 1,3-phenylene, or unsubstituted 1,2-phenylene; wherein each R$^1$, R$^2$, and R$^3$ is independently unsubstituted (C$_1$-C$_{15}$)alkyl, alternatively (C$_1$-C$_3$)alkyl, alternatively methyl. In some aspects one R is the —CH$_2$SiR$^1$R$^2$R$^3$ and the other R is a tert-butyl-phenylmethyl.

Aspect 5. The compound of aspect 1 wherein each R independently is CH$_2$Si(CH$_3$)$_3$ or CH$_2$-(phenylene)-SiR$^1$R$^2$R$^3$; and wherein (i) R$^1$ and R$^2$ are methyl, and R$^3$ is unsubstituted (C$_2$-C$_{15}$)alkyl, alternatively unsubstituted (C$_3$-C$_5$)alkyl, alternatively unsubstituted (C$_6$-C$_{15}$)alkyl; or (ii) each of R$^1$, R$^2$, and R$^3$ is methyl.

Aspect 6. The compound of aspect 1 wherein one R is CH$_2$Si(CH$_3$)$_3$ or CH$_2$-(phenylene)-SiR$^1$R$^2$R$^3$; and wherein (i) R$^1$ and R$^2$ are methyl, and R$^3$ is unsubstituted (C$_2$-C$_{15}$)alkyl, alternatively unsubstituted (C$_3$-C$_5$)alkyl; or (ii) each of R$^1$, R$^2$, and R$^3$ is methyl; and wherein the other R is a quaternary-alkyl substituted (C$_7$-C$_8$)arylalkyl group or an unsubstituted (C$_1$-C$_{15}$)alkyl group. In some aspects the quaternary alkyl substituted (C$_7$-C$_8$)arylalkyl group is tert-butyl-phenylmethyl (i.e., 1,1-dimethylethylphenylmethyl), alternatively CH$_2$-(1,4-phenylene)-C(CH$_3$)$_3$. In other aspects the other R is methyl, 2,2-dimethylpropyl, 2,2-dimethylhexyl, or hexyl, 2-ethylhexyl.

Aspect 7. The compound of aspect 5 or 6 wherein the phenylene is (i) unsubstituted 1,4-phenylene; (ii) unsubstituted 1,3-phenylene; or (iii) unsubstituted 1,2-phenylene. In some aspects the phenylene is unsubstituted 1,4-phenylene.

Aspect 8. The compound of any one of aspects 1 to 7 wherein M is Zr. In other aspects M is Hf.

Aspect 9. The compound of any one of aspects 1 to 8 characterized by solubility in hexanes containing at least 60 weight percent n-hexane (CH$_3$(CH$_2$)$_4$CH$_3$) of at least 0.10 weight percent based on total weight of the compound and hexanes.

Aspect 10. A compound of formula (1A):

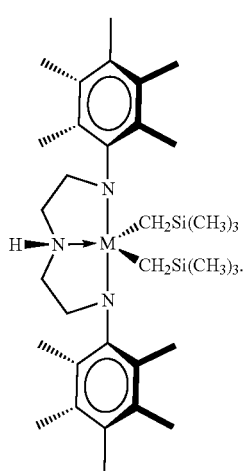

(1A)

Aspect 11. A method of synthesizing the compound of formula (1) of any one of aspects 1 to 10, the method comprising contacting a compound of formula (2)

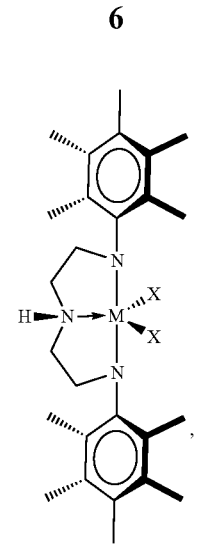

(2)

wherein M is as defined for compound (1) and each X independently is Cl, Br, or I, with an organometallic reagent of formula X$^1$MgR or M$^1$Rn; wherein R is as defined for compound (1) according to any one of aspects 1 to 10; X$^1$ is Cl, Br, or I; M$^1$ is selected from Li, Zn, Sn, and Cu; and subscript n is an integer from 1 to 4 and is equal to the formal oxidation state of M$^1$; in an aprotic solvent under effective reaction conditions, thereby synthesizing the compound of formula (1). In some aspects the organometallic reagent X$^1$MgR is used and is X$^1$MgC((R$^A$)$_2$)$_m$SiR$^1$R$^2$R$^3$, alternatively X$^1$MgCH$_2$SiR$^1$R$^2$R$^3$, alternatively X$^1$MgCH$_2$Si(CH$_3$)$_3$, alternatively trimethylsilylmethylmagnesium chloride; wherein X$^1$ is Cl or Br, alternatively Cl, alternatively Br. In some aspects the organometallic reagent M$^1$Rn is used and is M$^1$(C((R$^A$)$_2$)$_m$SiR$^1$R$^2$R$^3$)$_n$, alternatively M$^1$(CH$_2$SiR$^1$R$^2$R$^3$)$_n$, alternatively M$^1$(CH$_2$Si(CH$_3$)$_3$)$_n$, alternatively trimethylsilylmethyl lithium; wherein M$^1$ is Li. In some aspects the molar ratio of moles of compound (2) to moles of the organometallic halide reagent is from 1:2 to 1:10.

Aspect 12. The method of aspect 11 further comprising a preliminary step of contacting a compound of formula (3):

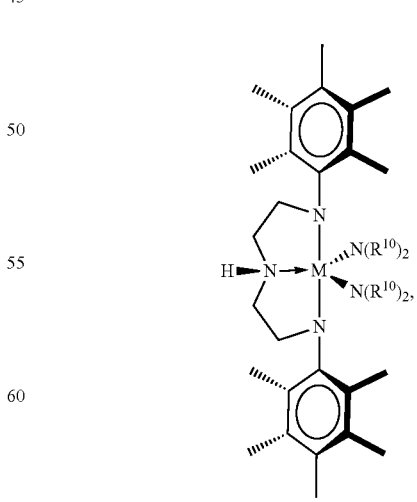

(3)

wherein each R$^{10}$ independently is (C$_1$-C$_{15}$)alkyl, alternatively (C$_1$-C$_6$)alkyl, with a reagent of formula X—Si(CH$_3$)$_3$, wherein X is as defined for the compound (2), in an aprotic solvent under effective reaction conditions to synthesize the compound (2). In some aspects reagent X—Si(CH$_3$)$_3$ is trimethylsilyl chloride, trimethylsilyl bromide or trimethylsilyl iodide; alternatively trimethylsilyl chloride (also known as chlorotrimethylsilane).

Aspect 13. The method of aspect 12, further comprising a preliminary step of contacting a compound of formula (4):

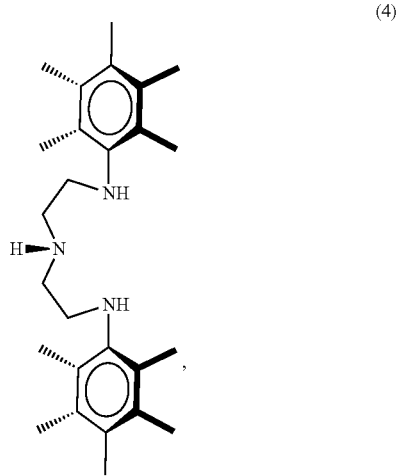

(4)

with a reagent of formula M(N(R$^{10}$)$_2$)$_4$, wherein M is as defined for compound (1) and each R$^{10}$ independently is (C$_1$-C$_{15}$)alkyl, in an aprotic solvent under effective reaction conditions to synthesize the compound (3). In some aspects each R$^{10}$ independently is alternatively (C$_1$-C$_6$)alkyl, alternatively methyl or ethyl, alternatively methyl. In some aspects the compound being synthesized in aspects 12 to 13 is the compound of any one of aspects 1 to 10. The molar ratio of compound (4) to M(N(R$^{10}$)$_2$)$_4$ may be from 1:10 to 10:1, alternatively from 1:5 to 5:1, alternatively from 1:2 to 2:1, alternatively 1:1.

Aspect 14. A solution of the compound of any one of aspects 1 to 10 in an alkane, wherein the solution is a liquid at 25 degrees Celsius and 101 kilopascals and the concentration of the compound in the solution is at least 0.10 weight percent based on weight of the solution. The alkane may be hexanes, isopentane, a mineral oil, or a combination of any two or more thereof. The alkane may be hexanes and/or isopentane, alternatively hexanes and/or a mineral oil, alternatively isopentane and/or a mineral oil.

Aspect 15. A catalyst system comprising, or made from, a compound of any one of aspects 1 to 10, an activator, optionally a hydrocarbon solvent, and optionally a support material. The catalyst system may be a homogeneous catalyst system (one phase) or a heterogeneous catalyst system (two phase). The activator may be an alkylaluminoxane or a trialkylaluminum compound. In some aspects the catalyst system comprises the support material, and the support material is an untreated silica, alternatively a calcined untreated silica, alternatively a hydrophobing agent-treated silica, alternatively a calcined and hydrophobing agent-treated silica. In some aspects the hydrophobing agent is dichlorodimethylsilane. The catalyst system is useful as an olefin polymerization catalyst system in solution phase, slurry phase, and gas phase polymerization reactions, such as may be used for making polyethylene polymers or polypropylene polymers. In some aspects the formulation is free of Cr, Ti, Mg, or an unsubstituted or substituted cyclopentadienyl group; alternatively Cr, Ti, and Mg; alternatively an unsubstituted or substituted cyclopentadienyl group.

Aspect 16. The catalyst system of aspect 15 further comprising a metallocene precatalyst, or a product of an activation reaction of the metallocene precatalyst and an activator. The activator contacting the metallocene precatalyst may be the same as, alternatively different than the activator contacting the compound (1). In some aspects the metallocene precatalyst or product of activation thereof further comprises a support material, which may be the same as or different than the optional support material for compound (1). Examples of such metallocene precatalysts are described later.

Aspect 17. A method of making a polyolefin polymer, the method comprising contacting the catalyst system of aspect 15 or 16 with at least one olefin monomer selected from ethylene, propylene, a (C$_4$-C$_{20}$)alpha-olefin, and 1,3-butadiene in a polymerization reactor under effective polymerization conditions, thereby making the polyolefin polymer. In some aspects the at least one olefin monomer is ethylene and optionally a (C$_4$, C$_6$, or C$_8$)alpha-olefin. The polymerization reactor may be a reactor configured for solution phase polymerization, slurry phase polymerization, or gas phase polymerization of the at least one olefin monomer. The reactors and effective polymerization conditions for solution phase polymerization, slurry phase polymerization, or gas phase polymerization are well known.

Without wishing to be bound by theory, it is believed that the quaternary-silahydrocarbyl groups, R, impart enhanced solubility of compound (1) in alkanes. The enhanced solubility may be characterized for comparison purposes as solubility of compound (1) in hexanes containing at least 60 weight percent n-hexane (CH$_3$(CH$_2$)$_4$CH$_3$) as measured using the Solubility Test Method, described below. Advantageously, compound (1) has a solubility in hexanes containing at least 60 weight percent n-hexane of at least 0.10 wt % in an alkane solvent. In some aspects, the solubility of compound (1) in hexanes containing at least 60 weight percent n-hexane is from 0.10 to 25 wt %, alternatively from 0.5 wt % to 25 wt %, alternatively from 1 wt % to 25 wt %, alternatively from 2 wt % to 25 wt %, alternatively from 3 wt % to 25 wt %, alternatively from 5 wt % to 25 wt %, alternatively from 10.0 wt % to 25 wt %, alternatively from 15 wt % to 25 wt %, alternatively from 20.0 wt % to 25 wt %, alternatively from 0.10 to 20.0 wt %, alternatively from 0.5 wt % to 20.0 wt %, alternatively from 1 wt % to 15 wt %, alternatively from 2 wt % to 15 wt %, alternatively from 3 wt % to 15 wt %, alternatively from 5 wt % to 15 wt %, alternatively from 1.0 wt % to 15 wt %, alternatively from 1.0 wt % to 10.0 wt %, as measured using the Solubility Test Method. Advantageously, the solubility in hexanes containing at least 60 weight percent n-hexane of compound (1) is surprisingly better than that of HN5Zr dibenzyl, which has solubility of just 0.03 wt % in hexanes containing at least 60 weight percent n-hexane.

Compound (1) may be employed either in a first part (a main catalyst) or in a second part (as trim catalyst) of the catalyst system. Compound (1) is useful in the combining-the-parts feed method described in the INTRODUCTION. Additionally, compound (1) may be combined with an activator and the combination fed to an in-line mixer or a polymerization reactor independently from feeding of a combination of the metallocene precatalyst and activator to the same in-line mixer or polymerization reactor. This so-called "separate-the-parts" feed method beneficially avoids the aforementioned transition complexity of transitions between catalyst systems and enables greater operational flexibility for olefin polymerization processes in a single polymerization reactor.

Compound (1) has sufficient solubility in alkanes such that it may be employed as a HMW precatalyst, with or without a LMW precatalyst, in the catalyst system. The increased solubility of compound (1) in alkanes also enables greater flexibility in a polymerization processes run in a single polymerization reactor and for making a bimodal polyethylene composition comprising LMW and HMW polyethylene components.

Compound (1) solves the instability problem of prior alkanes-insoluble non-MCN precatalysts because compound (1) may be stored as a solution in alkanes free of activator.

The catalyst system made from compound (1) and activator has faster light-off than a comparative catalyst system made from HN5Zr dibenzyl and the same activator. And yet compound (1) may make a polyethylene having same MWD as MWD of a polyethylene made by the comparative catalyst system. The faster light-off of the catalyst system made from compound (1) and the activator may beneficially result in reduced distributor plate fouling in a gas phase polymerization reactor containing a recycle loop, whereby some polymer particles with active catalyst are entrained back to the reactor where they can grow and foul the distributor plate. The faster light-off of the catalyst system may be characterized as a shorter time to maximum temperature as measured in vitro using 1-octene as monomer according to the Light-off Test Method, described later.

The catalyst system made from compound (1) and activator enables making of polyethylene resins having a lesser proportion of particles characterized as "fines", which is defined later. There are many well-known reasons why fines can cause problems in operating a gas phase polymerization reactor having a recycle line and/or an expanded upper section, such as UNIPOL™ reactor from Univation Technologies, LLC or other reactors. Fines are known to lead to an increased tendency for static and sheeting in such reactor. Fines can increase particle carry-over from the reactor into the recycle line and result in fouling inside the recycle loop, such as in a heat exchanger, compressor, and/or distributor plate. Fines can also build up in the reactor's expanded section because, it is believed, fines are more prone and/or susceptible to electrostatic forces. Fines can also cause problems with polyethylene polymers made by gas phase polymerization in such a reactor. Fines may continue to polymerize in cold zones of the reactor, either in the recycle loop or expanded section, and produce a polyethylene having a molecular weight that is higher than that targeted in the bulk fluidized bed. Fines can eventually make their way back from the recycle loop into the fluidized bed, and then into the polyethylene product, leading to higher level of gels in the polyethylene product. The polyethylene resins made by the catalyst system made from compound (1) and an activator have reduced wt % of fines.

The catalyst system made from compound (1) and activator enables making of polyethylene resins having larger particle sizes than those of polyethylene resins made by the comparative catalyst system made from the HN5Zr dibenzyl and the same activator. The larger particle sizes of polyethylene resins made by the inventive catalyst system may be useful for decreasing settled bulk densities of the resin. Resins with a higher proportion of fines can have a higher settled bulk density because the smaller particles of the fines can shift downward and fill in spaces between larger particles. If the settled bulk density is too high, the resin can be difficult to fluidize, causing localized overheating and forming resin chunks in certain regions of the reactor process such as near edges of a distributor plate or in a product discharge system.

A polyethylene resin may be made using a bimodal catalyst system, wherein an alkanes solution of compound (1) is used as trim catalyst (second part) and a combination of all of an MCN precatalyst, activator, and a remainder of compound (1) are used as the first part, all of a combining-the-parts feed method, may have reduced gel content compared to a polyethylene resin made using the same bimodal catalyst system except wherein a supported HN5Zr dibenzyl is used as trim catalyst and a remainder of HN5Zr dibenzyl and the same MCN precatalyst are used as the first part. Because the compound (1) has significantly greater solubility in hexanes containing at least 60 weight percent n-hexane, than does HN5Zr dibenzyl, compound (1) has significantly greater solubility in alkanes solvents such as mineral oil than does HN5Zr dibenzyl. This means compound (1) may be fed as an alkanes solution (e.g., typically a solution in mineral oil) as a trim catalyst in the "combining-the-parts" feed method described earlier, whereby it can be mixed with a remainder of compound (1) and all of the MCN precatalyst of a first part in an in-line mixer to give a bimodal catalyst system that may make a bimodal polyethylene composition without the increased gel content found for HN5Zr dibenzyl for the reasons described above, and to solve the earlier gel problem.

Without being bound by theory, it is believed that if in a comparative precatalyst of formula (1) wherein the subscript m would be 0, and thus the silicon atom of the quaternary-silahydrocarbyl groups would be directly bonded to metal M, a synthesis of such a comparative precatalyst may be difficult and/or an electronic difference between Si versus C could affect catalytic activity or performance of catalyst made therefrom. Alternatively, if in a comparative precatalyst of formula (1) wherein the subscript m would be 4 or greater, and thus the silicon atom of the quaternary-silahydrocarbyl groups would be spaced apart from the metal M by additional carbon atoms, a steric effect of the closer inventive quaternary Si functional group on metal M could be lost.

Compound (1) is a non-metallocene precatalyst of molecular formula $(C_{26}H_{39}N_3)MR_2$, wherein M and R groups are as defined for compound (1). Compound (1) contains two N-substituted pentamethyl-phenyl groups and may have general chemical name bis(quaternary-silahydrocarbyl)[N'-(2,3,4,5,6-pentamethylphenyl)-N-[2-(2,3,4,5,6-pentamethylphenyl)amino-κN]ethyl]-1,2-ethane-diaminato(2-)κN,κN'](zirconium or hafnium). For example, when M is Zr and each R is a quaternary-silahydrocarbyl that is 4-trimethylsilylbenzyl, compound (1) may have chemical name bis(4-trimethylsilylbenzyl)[N'-(2,3,4,5,6-pentamethylphenyl)-N-[2-(2,3,4,5,6-pentamethylphenyl)amino-κN]ethyl]-1,2-ethane-diaminato(2-)κN,κN']zirconium.

In compound (1) each R independently may be the unsubstituted or substituted quaternary-silahydrocarbyl group of formula $-C((R^A)_2)_mSiR^1R^2R^3$, wherein subscript m, $R^A$, R1, R2, and R3 are as defined for compound (1) of any one of aspects 2 to 6. In some aspects, each R is the same or different and is selected from: trimethylsilylmethyl, dimethylethylsilylmethyl, dimethyl(n-propyl)silylmethyl, dimethyl(n-butyl)silylmethyl, dimethyl(n-pentyl)silylmethyl, dimethyl(n-hexyl)silylmethyl, dimethyl(n-heptyl)silylmethyl, dimethyl(n-octyl)silylmethyl, dimethyl(n-decyl)silylmethyl, dimethyl(n-dodecyl)silylmethyl, triethylsilylmethyl, methyldiethylsilylmethyl, dimethyl(2-ethylhexyl)

silylmethyl, dimethyl(trimethylsilylmethyl)silylmethyl, dimethyl(3,3-dimethylbutyl)silylmethyl, dimethyl(1,1-dimethylethyl)silylmethyl, and dimethyl(2-methylpropyl)silylmethyl. In some aspects each R is the same.

In some aspects compound (1) is selected from: (i) compound (1A); (ii) compound (1) wherein each R is 2-trimethylsilylphenylmethyl; (iii) compound (1) wherein each R is 3-trimethylsilylphenylmethyl; (iv) compound (1) wherein each R is 4-trimethylsilylphenylmethyl; (v) compound (1) wherein each R is 4-(dimethyl-n-octylsilyl)-phenylmethyl (i.e., 4-$(CH_3(CH_2)_7Si(CH_3)_2)$—$C_6H_4$—$CH_2$—); (vi) compound (1) wherein one R is trimethylsilylmethyl (i.e., $CH_2Si(CH_3)_3$) and the other R is methyl; (vii) compound (1) wherein one R is trimethylsilylmethyl and the other R is 4-tert-butylphenylmethyl; (viii) a combination of any two or more of (i) to (vii).

Compound (1) includes solvates and solvent-free embodiments thereof.

The unsubstituted quaternary-silahydrocarbyl group is formally derived by replacing a quaternary carbon atom of a (quaternary carbon atom)-functional hydrocarbyl group with a silicon atom. The substituted quaternary-silahydrocarbyl group is formally derived by replacing from 1 to 4 hydrogen atoms (i.e., carbon-bonded hydrogen atoms, H—C, independently chosen) of the unsubstituted silahydrocarbon with a substituent group.

In some aspects each unsubstituted quaternary-silahydrocarbyl group has from 4 to 50 carbon atoms, alternatively from 4 to 20 carbon atoms, alternatively from 4 to 10 carbon atoms, alternatively from 5 to 6 carbon atoms.

Compound (1), after being activated with an activator, makes a catalyst system that is effective for polymerizing one or more olefin monomers, thereby making a polyolefin polymer. Each olefin monomer is independently selected from ethylene, propylene, a $(C_4-C_{20})$alpha-olefin, and 1,3-butadiene. Each $(C_4-C_{20})$alpha-olefin independently may be 1-butene, 1-hexene, or 1-octene; alternatively 1-butene or 1-hexene; alternatively 1-butuene; alternatively 1-hexene. In some aspects the olefin monomer is selected from ethylene, a $(C_4-C_{20})$alpha-olefin, and 1,3-butadiene; alternatively ethylene and a $(C_4-C_{20})$alpha-olefin; alternatively ethylene and 1-hexene; alternatively ethylene and 1-octene; alternatively ethylene.

Compound (1) may be used with a metallocene catalyst to make a bimodal catalyst system for making a bimodal polyethylene composition. In some aspects, compound (1) is combined with a metallocene precatalyst or catalyst, at least one activator, and optionally a support, to make a catalyst system comprising, or made from, the metallocene precatalyst, compound (1), the at least one activator, and optionally the support (solid, particulate material). Compound (1) is useful for making a HMW polyethylene component of a bimodal polyethylene composition. The metallocene precatalyst is useful for making a LMW polyethylene component of the bimodal polyethylene composition. The bimodal polyethylene composition is made by polymerizing one or more olefin monomers. In some aspects the bimodal polyethylene composition is made from ethylene only; alternatively from a combination of ethylene and one $(C_4-C_8)$alpha-olefin comonomer. Compound (1) may also be interchangeably referred to as a precatalyst, a catalyst component, or a HMW catalyst.

Also contemplated is a derivative of compound (1) wherein compound (4) is covalently bonded to a carrier polymer. In an embodiment, the middle nitrogen atom (bonded to two ethylene groups) in compound (4) may bonded to the carrier polymer. Alternatively a methyl group of one of the pentamethylcyclopentadienyl groups of compound (4) might be replaced with an alkylene group that is bonded to the carrier polymer. Ligand-bound polymers are generally described in U.S. Pat. Nos. 5,473,202 and 5,770,755.

In the method of synthesizing compound (1), including the preliminary steps, an aprotic solvent may be used in any one or more of the contacting steps. The aprotic solvent independently may be a hydrocarbon solvent such as an alkylarene (e.g., toluene, xylene), an alkane, a chlorinated aromatic hydrocarbon (e.g., chlorobenzene), a chlorinated alkane (e.g., dichloromethane), a dialkyl ether (e.g., diethyl ether), or a mixture of any two or more thereof. The aprotic solvent may be any one of those used later in the synthesis Examples.

Each of the contacting steps in the method of synthesizing compound (1) independently may be conducted under effective reaction conditions. Effective reaction conditions may comprise techniques for manipulating air-sensitive and/or moisture-sensitive reagents and reactants such as Schlenk-line techniques and an inert gas atmosphere (e.g., nitrogen, helium, or argon). Effective reaction conditions may also comprise a sufficient reaction time, a sufficient reaction temperature, and a sufficient reaction pressure. Each reaction temperature independently may be from −78° to 120° C., alternatively from −30° to 30° C. Each reaction pressure independently may be from 95 to 105 kPa, alternatively from 99 to 103 kPa. Progress of any particular reaction step may be monitored by analytical methods such as nuclear magnetic resonance (NMR) spectroscopy, mass spectrometry to determine a reaction time that is effective for maximizing yield of intended product. Alternatively, each reaction time independently may be from 30 minutes to 48 hours.

"Hydrocarbon solvent" means a liquid material at 25° C. that consists of carbon and hydrogen atoms, and optionally one or more halogen atoms, and is free of carbon-carbon double bonds and carbon-carbon triple bonds. The hydrocarbon solvent may be an alkane, an arene, or an alkylarene (i.e., arylalkane). Examples of hydrocarbon solvents are alkanes such as mineral oil, pentanes, hexanes, heptanes, octanes, nonanes, decanes, undecanes, dodecanes, etc., and toluene, and xylenes. In one embodiment, the hydrocarbon solvent is an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof. Additional examples of suitable alkanes include Isopar-C, Isopar-E, and mineral oil such as white mineral oil. In some aspects the hydrocarbon solvent is free of mineral oil. The hydrocarbon solvent may consist of one or more $(C_5-C_{12})$alkanes.

The catalyst system comprises a combination of compound (1) and an activator; alternatively the catalyst system comprises an activation reaction product of an activation reaction of compound (1) and the activator.

The catalyst system may be made under effective activation conditions. Effective activation conditions may comprise techniques for manipulating catalysts such as in-line mixers, catalyst preparation reactors, and polymerization reactors. The activation may be performed in an inert gas atmosphere (e.g., nitrogen, helium, or argon). Effective activation conditions may also comprise a sufficient activation time and a sufficient activation temperature. Each activation temperature independently may be from 20° to 800° C., alternatively from 300° to 650° C. Each activation time independently may be from 10 seconds to 2 hours.

"Activator", also known as a cocatalyst, is a compound or a composition comprising a combination of reagents, wherein the compound or composition increases the rate at which a transition metal compound (e.g., compound (1) or metallocene precatalyst) oligomerizes or polymerizes unsaturated monomers, such as olefins, such as ethylene or 1-octene. An activator may also affect the molecular weight, degree of branching, comonomer content, or other properties of the oligomer or polymer (e.g., polyolefin). The transition metal compound (e.g., compound (1) or metallocene precatalyst) may be activated for oligomerization and/or polymerization catalysis in any manner sufficient to allow coordination or cationic oligomerization and or polymerization. Examples of suitable activators are alkylaluminoxanes and trialkylaluminum compounds.

Aluminoxane (also known as alumoxane) activators may be utilized as an activator for one or more of the precatalyst compositions including compound (1) or metallocene precatalyst. Aluminoxane(s) are generally oligomeric compounds containing —Al(R)—O— subunits, where R is an alkyl group; which are called alkylaluminoxanes (alkylaluminoxanes). The alkylaluminoxane may be unmodified or modified. Examples of alkylaluminoxanes include methylaluminoxane (MAO), modified methylaluminoxane (MMAO), ethylaluminoxane, and isobutylaluminoxane. Unmodified alkylaluminoxanes and modified alkylaluminoxanes are suitable as activators for precatalysts such as compound (1). Mixtures of different aluminoxanes and/or different modified aluminoxanes may also be used. For further descriptions, see U.S. Pat. Nos. 4,665,208; 4,952, 540; 5,041,584; 5,091,352; 5,206,199; 5,204,419; 4,874, 734; 4,924,018; 4,908,463; 4,968,827; 5,329,032; 5,248, 801; 5,235,081; 5,157,137; 5,103,031; and EP 0 561 476; EP 0 279 586; EP 0 516 476; EP 0 594 218; and PCT Publication WO 94/10180.

When the activator is an aluminoxane (modified or unmodified), the maximum amount of activator may be selected to be a 5,000-fold molar excess over the precursor based on the molar ratio of moles of Al metal atoms in the aluminoxane to moles of metal atoms M (e.g., Zr or Hf) in the precatalyst (e.g., compound (1)). Alternatively or additionally the minimum amount of activator-to-precatalyst-precursor may be a 1:1 molar ratio (Al/M).

Trialkylaluminum compounds may be utilized as activators for precatalyst (e.g., compound (1) or metallocene precatalyst) or as scavengers to remove residual water from polymerization reactor prior to start-up thereof. Examples of suitable alkylaluminum compounds are trimethylaluminum, triethylaluminum, triisobutylaluminum, tri-n-hexylaluminum, and tri-n-octylaluminum.

The catalyst system may include a support or carrier material. A support material is a particulate solid that may be nonporous, semi-porous, or porous. A carrier material is a porous support material. Examples of support materials are talc, inorganic oxides, inorganic chloride, zeolites, clays, resins, and mixtures of any two or more thereof. Examples of suitable resins are polystyrene, functionalized or cross-linked organic supports, such as polystyrene divinyl benzene polyolefins.

Inorganic oxide support materials include Group 2, 3, 4, 5, 13 or 14 metal oxides. The preferred supports include silica, which may or may not be dehydrated, fumed silica, alumina (see, for example, PCT Publication WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in PCT Publication WO 99/47598; aerogels as disclosed in PCT Publication WO 99/48605; spherulites as disclosed in U.S. Pat. No. 5,972,510; and polymeric beads as disclosed in PCT Publication WO 99/50311.

The support material may have a surface area in the range of from about 10 $m^2/g$ to about 700 $m^2/g$, a pore volume in the range of from about 0.1 $cm^3/g$ to about 4.0 $cm^3/g$, and average particle size in the range of from about 5 microns to about 500 microns. The support material may be a silica (e.g., fumed silica), alumina, a clay, or talc. The fumed silica may be hydrophilic (untreated), alternatively hydrophobic (treated). In some aspects the support is a hydrophobic fumed silica, which may be prepared by treating an untreated fumed silica with a hydrophobing agent such as dimethyldichlorosilane, a polydimethylsiloxane fluid, or hexamethyldisilazane. In some aspects the treating agent is dimethyldichlorosilane. In one embodiment, the support is Cabosil™ TS-610.

One or more compound(s) (1) and/or one or more activators, and optionally other precatalyst (e.g., a metallocene or Ziegler-Natta precatalyst), may be deposited on, contacted with, vaporized with, bonded to, or incorporated within, adsorbed or absorbed in, or on, one or more support or carrier materials. The resulting supported catalyst system comprises the inventive catalyst (compound (1) and activator), optional other catalyst (e.g., metallocene precatalyst or Ziegler-Natta precatalyst and activator) is/are in a supported form deposited on, contacted with, or incorporated within, adsorbed or absorbed in, or on, the material.

The compound (1) and/or other precatalysts may be spray dried according to the general methods described in U.S. Pat. No. 5,648,310. The support used with compound (1), and any other precatalysts, may be functionalized, as generally described in EP 0 802 203, or at least one substituent or leaving group is selected as described in U.S. Pat. No. 5,688,880.

The metallocene precatalyst may be any one of the metallocene catalyst components described in U.S. Pat. No. 7,873,112B2, column 11, line 17, to column 22, line 21. In some aspects the metallocene precatalyst is selected from the metallocene precatalyst species named in U.S. Pat. No. 7,873,112B2, column 18, line 51, to column 22, line 5. In some aspects the metallocene precatalyst is selected from bis(η5-tetramethylcyclopentadienyl)zirconium dichloride; bis(η$^5$-tetramethylcyclopentadienyl)zirconium dimethyl; bis (η$^5$-pentamethylcyclopentadienyl)zirconium dichloride; bis (η$^5$-pentamethylcyclopentadienyl)zirconium dimethyl; (1,3-dimethyl-4,5,6,7-tetrahydroindenyl)(1-methylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis (n-propylcyclopentadienyl)hafnium dichloride; bis(n-propylcyclopentadienyl)hafnium dimethyl; bis(n- butylcyclopentadienyl)zirconium dichloride; and bis(n-butylcyclopentadienyl)zirconium dimethyl. In some aspects the metallocene catalyst is a product of an activation reaction of an activator and any one of the aforementioned metallocene precatalysts.

Solution phase polymerization and/or slurry phase polymerization of olefin monomer(s) are well-known. See for example U.S. Pat. No. 8,291,115B2.

An aspect of the polymerization method uses a gas-phase polymerization (GPP) reactor, such as a stirred-bed gas phase polymerization reactor (SB-GPP reactor) or a fluidized-bed gas-phase polymerization reactor (FB-GPP reactor), to make the polyolefin polymer. Such reactors and methods are generally well-known. For example, the FB-GPP reactor/method may be as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421

Polymerization operating conditions are any variable or combination of variables that may affect a polymerization reaction in the GPP reactor or a composition or property of a bimodal ethylene-co-1-hexene copolymer composition product made thereby. The variables may include reactor design and size; compound (1) composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In operating the polymerization method, control individual flow rates of ethylene ("$C_2$"), hydrogen ("$H_2$") and 1-hexene ("$C_6$" or "$C_x$" wherein x is 6) to maintain a fixed comonomer to ethylene monomer gas molar ratio ($C_x/C_2$, e.g., $C_6/C_2$) equal to a described value (e.g., 0.00560 or 0.00703), a constant hydrogen to ethylene gas molar ratio ("$H_2/C_2$") equal to a described value (e.g., 0.00229 or 0.00280), and a constant ethylene ("$C_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described first reactor bed temperature RBT. Maintain the fluidized bed at a constant height by withdrawing a portion of the bed at a rate equal to the rate of production of particulate form of the bimodal ethylene-co-1-hexene copolymer composition, which production rate may be from 10 to 20 kilograms per hour (kg/hour). Remove the product bimodal ethylene-co-1-hexene copolymer composition semi-continuously via a series of valves into a fixed volume chamber, wherein this removed bimodal ethylene-co-1-hexene copolymer composition is purged to remove entrained hydrocarbons and treated with a stream of humidified nitrogen ($N_2$) gas to deactivate any trace quantities of residual catalyst. See polymerization method described herein.

The catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

Induced condensing agent (ICA). An inert liquid useful for cooling materials in gas phase polymerization reactor(s). Its use is optional. The ICA may be a ($C_5$-$C_{20}$)alkane, e.g., 2-methylbutane (i.e., isopentane). Aspects of the method of polymerization that use the ICA may be referred to as being an induced condensing mode operation (ICMO). ICMO is described in U.S. Pat. Nos. 4,453,399; 4,588,790; 4,994,534; 5,352,749; 5,462,999; and 6,489,408. Measure concentration of ICA in gas phase using gas chromatography by calibrating peak area percent to mole percent (mol %) with a gas mixture standard of known concentrations of gas phase components. Concentration of ICA may be from 1 to 10 mol %.

The polymerization conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

In an embodiment the method uses a pilot scale fluidized bed gas phase polymerization reactor (Pilot Reactor) that comprises a reactor vessel containing a fluidized bed of a powder of the bimodal ethylene-co-1-hexene copolymer composition, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin (e.g., 1-hexene), and hydrogen being fed into the Pilot Reactor are monitored by an in-line gas chromatograph in the cycle loop in order to maintain specific concentrations that define and enable control of polymer properties. The catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower 1/3 of its bed height. The Pilot Reactor further comprises a way of weighing the fluidized bed and isolation ports (Product Discharge System) for discharging the powder of bimodal ethylene-co-1-hexene copolymer composition from the reactor vessel in response to an increase of the fluidized bed weight as polymerization reaction proceeds.

In some embodiments the FB-GPP reactor is a commercial scale reactor such as a UNIPOL™ reactor or UNIPOL™ II reactor, which are available from Univation Technologies, LLC, a subsidiary of The Dow Chemical Company, Midland, Michigan, USA.

In some aspects any compound, composition, formulation, material, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, material, mixture, or reaction product (e.g., Zr required by a zirconium compound, or C and H required by a polyethylene, or C, H, and O required by an alcohol) are not counted.

Activator. A substance that increases the rate of a catalyzed reaction, wherein the substance is not the precatalyst, support material, or monomer. Typically, the activator contains aluminum and/or boron, alternatively aluminum.

Bimodal. Two, and only two, modalities or modes.

Bimodal in reference to a polymer composition means the polymer composition consists essentially of a higher molecular weight (HMW) component and a lower molecular weight (LMW) component. Bimodal polymer compositions include post-reactor blends (wherein the LMW and HMW components are synthesized in different reactors or in a same reactor at different times separately and later blended together such as by melt extrusion) and reactor blends (wherein the LMW and HMW components are synthesized in the same reactor). The bimodal copolymer composition may be characterized by two peaks separated by a distinguishable local minimum therebetween in a plot of dW/d Log(MW) on the y-axis versus Log(MW) on the x-axis to give a Gel Permeation Chromatograph (GPC) chromatogram, wherein Log(MW) and dW/d Log(MW) are as defined herein and are measured by Gel Permeation Chromatograph (GPC) Test Method described herein.

Bimodal when referring to a catalyst system means a catalyst system that contains two different catalysts for catalyzing a same polymerization process (e.g., olefin polymerization) and producing a bimodal polymer composition. Two catalysts are different if they differ from each other in at least one of the following characteristics: (a) their catalytic metals are different (Ti versus Zr, Zr versus Hf, Ti versus Hf; not activator metals such as Al); (b) one catalyst has a functional ligand covalently bonded to its catalytic metal and the other catalyst is free of functional ligands bonded to its catalytic metal; (c) both catalysts have functional ligands covalently bonded to their catalytic metal and the structures of at least one of functional ligand of one of the catalysts is different than the structure of each of the functional ligand(s) of the other catalyst (e.g., cyclopentadienyl versus propylcyclopentadienyl or butylcyclopentadienyl versus (pentamethylphenylamido)ethyl)-amine); and (d) for catalysts disposed on a support material, the compositions of the support materials are different. Functional ligands do not include leaving groups X as defined later. Two catalysts of a bimodal catalyst system may be disposed on the same support material, either on the same particles of the same support material or each on different particles of the same support material. The same catalyst in terms of catalytic metal and ligands wherein a portion thereof is disposed on a support material and a different portion thereof is dissolved in an inert solvent, the portions do not by themselves constitute a bimodal catalyst system.

Catalyst. A material that enhances rate of a reaction (e.g., the polymerization of ethylene and 1-hexene) and is not completely consumed thereby.

Catalyst system. A reaction product of an activation reaction of a precatalyst and an activator (i.e., a catalyst per se) and, optionally, one or more compatible companion materials such as a different catalyst for making a component of a bimodal polymer, a hydrocarbon solvent for conveying the catalyst, a modifier compound for attenuating reactivity of the catalyst, a support material on which the catalyst is disposed, a carrier material in which the catalyst is disposed, or a combination of any two or more thereof, or a reaction product of a reaction thereof.

Consisting essentially of, consist(s) essentially of, and the like. Partially-closed ended expressions that exclude anything that would affect the basic and novel characteristics of that which they describe, but otherwise allow anything else. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

Dry. Generally, a moisture content from 0 to less than 5 parts per million based on total parts by weight. Materials fed to the reactor(s) during a polymerization reaction are dry.

Feed. Quantity of reactant or reagent that is added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Feed line. A pipe or conduit structure for transporting a feed.

Higher molecular weight (HMW) component. A subgroup of macromolecules having a peak in the GPC plot of dW/d Log(MW) on the y-axis versus Log(MW) on the x-axis that is at a higher molecular weight.

Hydrocarbyl. A monovalent radical formally derived by removing a H atom from a hydrocarbon compound consisting of C and H atoms.

Hydrocarbylene. A divalent radical formally derived by removing two H atoms from a hydrocarbon compound consisting of C and H atoms, wherein the two H atoms are removed from different carbon atoms of the hydrocarbon compound.

Inert. Generally, not (appreciably) reactive or not (appreciably) interfering therewith in the inventive polymerization reaction. The term "inert" as applied to the purge gas or ethylene feed means a molecular oxygen (02) content from 0 to less than 5 parts per million based on total parts by weight of the purge gas or ethylene feed.

Lower molecular weight (LMW) component. A subgroup of macromolecules having a peak in the GPC plot of dW/d Log(MW) on the y-axis versus Log(MW) on the x-axis that is at a lower molecular weight.

Metallocene catalyst. Homogeneous or heterogeneous material that contains a cyclopentadienyl ligand-metal complex and enhances olefin polymerization reaction rates. Substantially single site or dual site. Each metal is a transition metal Ti, Zr, or Hf. Each cyclopentadienyl ligand independently is an unsubstituted cyclopentadienyl group or a hydrocarbyl-substituted cyclopentadienyl group. In some aspects the metallocene catalyst has two cyclopentadienyl ligands, and at least one, alternatively both of the cyclopentenyl ligands independently is a hydrocarbyl-substituted cyclopentadienyl group. Each hydrocarbyl-substituted cyclopentadienyl group may independently have 1, 2, 3, 4, or 5 hydrocarbyl substituents. Each hydrocarbyl substituent may independently be a $(C_1-C_5)$alkyl. Two or more substituents may be bonded together to form a divalent substituent, which with carbon atoms of the cyclopentadienyl group may form a ring.

Multimodal. Two or more modalities.

Ziegler-Natta catalysts. Heterogeneous materials that enhance olefin polymerization reaction rates and are prepared by contacting inorganic titanium compounds, such as titanium halides supported on a magnesium chloride support, with an activator.

Alternatively precedes a distinct embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). Periodic Table of the Elements is the IUPAC version of May 1, 2018. May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23° C.±1° C. "HN5" is not pentazole.

EXAMPLES

Isoparaffin fluid: ISOPAR-C from ExxonMobil.

Mineral oil: HYDROBRITE 380 PO White mineral oil from Sonneborn.

Preparation 1A: preparation of an activator formulation comprising spray-dried methylaluminoxane/treated fumed silica (sdMAO) in hexanes/mineral oil. Slurry 1.6 kg of treated fumed silica (CABOSIL TS-610) in 16.8 kg of toluene, then add a 10 wt % solution (11.6 kg) MAO in toluene to give a mixture. Using a spray dryer set at 160° C. and with an outlet temperature at 70° to 80° C., introduce the mixture into an atomizing device of the spray dryer to produce droplets of the mixture, which are then contacted with a hot nitrogen gas stream to evaporate the liquid from the mixture to give a powder. Separate the powder from the gas mixture in a cyclone separator, and discharge the separated powder into a container to give the sdMAO as a fine powder.

Preparation 1B: preparation of a slurry of the activator formulation of Preparation 1A. Slurry the sdMAO powder of Preparation 1A in a mixture of 10 wt % n-hexane and 78 wt % mineral oil to give the activator formulation having 12 wt % sdMAO/treated fumed silica solids in the hexane/mineral oil.

Preparation 2: preparation of a spray-dried metallocene with activator formulation. Replicate Preparations 1A and 1 B except prepare an activator formulation by slurrying 1.5 kg of treated fumed silica (CABOSIL TS-610) in 16.8 kg of toluene, followed by adding a 10 wt % solution (11.1 kg) of MAO in toluene and $(MeCp)(1,3-dimethyl-4,5,6,7-tetrahydroindenyl)ZrMe_2$, wherein Me is methyl, Cp is cyclopentadienyl, and MeCp is methylcyclopentadienyl, in an amount sufficient to provide a loading of 40 micromoles Zr per gram of solid. Slurry the resultant powder to give an activator formulation of 22 wt % solids in 10 wt % isoparaffin fluid and 68 wt % mineral oil. Advantageously, the activator formulation does not include a HMW precatalyst, and can be employed to produce polymer compositions with very low ratios of HMW/LMW components. Further, transitions to other catalyst systems are simplified compared to the combining-the-parts feed method of the Introduction.

Preparation 3: synthesis of compound (4) {(HN(CH2CH2NHC6(CH3)5)2)}. Replicate Procedure 2 of U.S. Pat. No. 6,967,184B2, column 33, line 53, to column 34, line 9, to give compound (4), as drawn above.

Bimodality Test Method: determine presence or absence of resolved bimodality by plotting dWf/d Log M (mass detector response) on y-axis versus Log M on the x-axis to obtain a GPC chromatogram curve containing local maxima log(MW) values for LMW and HMW polyethylene component peaks, and observing the presence or absence of a local minimum between the LMW and HMW polyethylene component peaks. The dWf is change in weight fraction, d Log M is also referred to as d Log(MW) and is change in logarithm of molecular weight, and Log M is also referred to as Log(MW) and is logarithm of molecular weight.

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the bimodal ethylene-co-1-hexene copolymer composition by using summed values of the weight fractions (Wf) of the LMW and HMW polyethylene components and the respective number average molecular weights (Mn) and weight average molecular weights ($M_w$) by known mathematical treatment of aggregated Schulz-Flory MW distributions.

Density is measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter ($g/cm^3$).

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (L). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) PTFE filter to give the solvent. PTFE is poly(tetrafluoroethylene). Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

High Load Melt Index (HLMI) $I_{21}$ Test Method: use ASTM D1238-13, *Standard Test Method for Melt Flow Rates of Thermoplastics by Extrusion Platometer*, using conditions of 190° C./21.6 kilograms (kg). Results are in units of grams eluted per 10 minutes (g/10 min.).

Light-off Test Method: Under an atmosphere of nitrogen in a glovebox, charge a 40 mL glass vial with a PTFE-coated, magnetic stir bar and 0.16 g of spray dried methylaluminoxane powder of Preparation 1A. To the charged vial add 11 mL of 1-octene, and then insert the vial into an insulated sleeve mounted on a magnetic stir plate turning at approximately 300 rotations per minute (rpm). To the insulated vial add 8 micromoles (μmol) of precatalyst (e.g., compound (1) or HN5Zr dibenzyl). Cap the vial with a rubber septum. Insert a thermocouple probe through the rubber septum into the vial such that the tip of the thermocouple probe is below the liquid level. Record the temperature of the contents of the vial at 5 second intervals, continuing until after the maximum temperature is reached. Download the temperature and time data to a spreadsheet, and plot thermo-kinetic profiles for analysis.

Melt Index 15 ("I5") Test Method: use ASTM D1238-13, using conditions of 190° C./5.0 kg. Report results in units of grams eluted per 10 minutes (g/10 min.).

Melt Flow Ratio MFR5: ("$I_{21}/I_5$") Test Method: calculated by dividing the value from the HLMI $I_{21}$ Test Method by the value from the Melt Index $I_5$ Test Method.

Solubility Test Method: to a 20-mL vial is added, at room temperature and ambient pressure, a known mass of test precatalyst (e.g., compound (1)) and a known volume of hexanes containing at least 60 weight percent n-hexane. A PTFE-coated magnetic stir bar is added and the mixture is allowed to stir for 1 hour before the vial is removed from the stir plate, and the mixture is allowed to sit overnight. The next day the suspension is filtered through a 0.4 μm PTFE syringe filter into a tared vial, giving a known mass of supernatant, and the hexanes are removed under reduced pressure, leaving a measurable mass of the compound of formula (1) from which wt. % solubility is calculated.

Comparative Example 1 (CE1): synthesis of [N'-(2,3,4,5,6-pentamethylphenyl)-N-[2-(2,3,4,5,6-pentamethylphenyl)amino-κN]ethyl]-1,2-ethane-diaminato(2-)κN,κN']zirconium dichloride (abbreviated herein as "HN5Zr dichloride") is described in U.S. Pat. No. 6,967,184B2. Measure the light-off performance according to the Light-Off Test Method. Time to maximum temperature result is reported later in Table 1.

Comparative Example 2 (CE2): synthesis of bis(phenylmethyl)[N'-(2,3,4,5,6-pentamethylphenyl)-N-[2-(2,3,4,5,6-pentamethylphenyl)amino-κN]ethyl]-1,2-ethane-diaminato (2-)κN,κN']zirconium (abbreviated herein as "HN5Zr dibenzyl") may be accomplished by reacting HN5Zr dichloride of CE1 with two molar equivalents of benzylmagnesium chloride in anhydrous tetrahydrofuran. Measure the light-off performance according to the Light-Off Test Method and measure the according to the Solubility Test Method. Solubility and time to maximum temperature results are reported later in Table 1.

Inventive Example 1 (IE1): synthesis of compound (3a) (compound (3) wherein each $R^{10}$ is methyl) from compound (4), which is prepared according to Preparation 3.

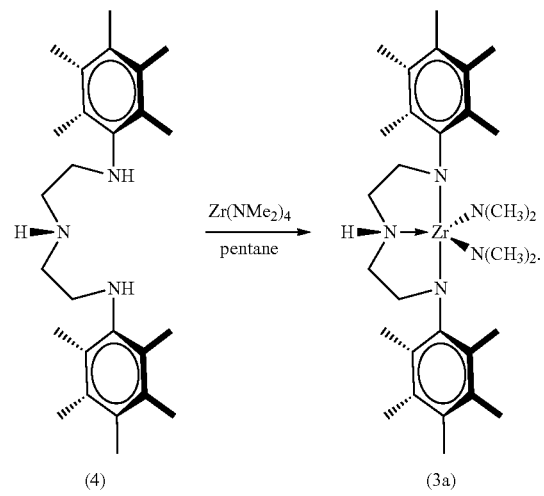

Under a nitrogen atmosphere in a glovebox, charge an oven-dried 400 mL glass jar with a PTFE-coated magnetic stir bar, compound (4) (10 g, 25.3 mmol), and 200 mL of dry, degassed n-pentane. Then add tetrakis(dimethylamino)zirconium(IV) (6.76 g, 25.3 mmol) as a solid in small portions, then stir the resulting reaction mixture at 25° C. for 16 hours. Cool the mixture in a freezer in the glove box for 1 hour to precipitate compound (3a). Filter off precipitated (3a), and wash the filtercake with cold n-pentane. Dry the washed compound (3a) under reduced pressure to give 12.62 g (87.1% yield) of compound (3a) as a white powder. $^1$H NMR (400 MHz, Benzene-$d_6$) δ 3.37 (dt, 2H), 3.10 (d, 6H), 3.02 (dd, 3H), 2.68 (dq, 4H), 2.51 (d, 12H), 2.20 (q, 18H), 2.14 (s, 7H), 1.84 (s, 1H); $^{13}$C NMR (101 MHz, Benzene-$d_6$) δ 149.77, 132.34, 132.14, 130.04, 129.98, 129.32, 56.29, 48.86, 44.35, 40.91, 17.31, 17.27, 16.72, 16.65, 16.09.

Inventive Example 2 (IE2): synthesis of compound (2a) (compound (2) wherein M is Zr and each X is Cl) from compound (3a)

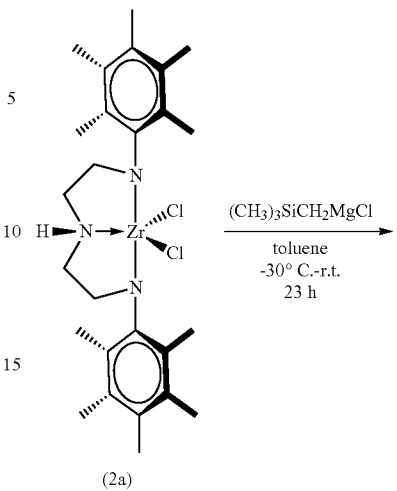

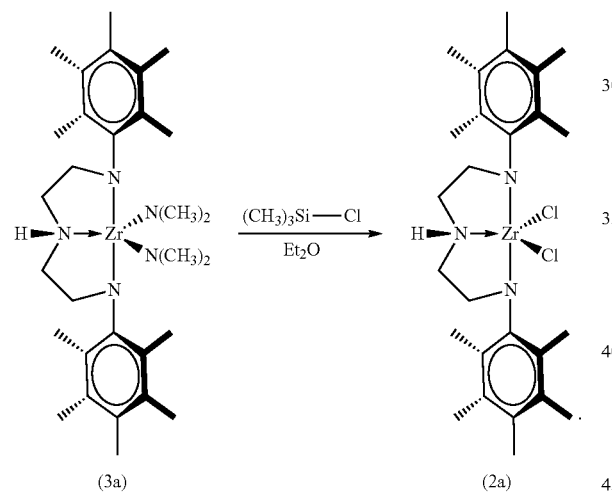

(3a) (2a). Under a nitrogen atmosphere in a glovebox, charged an oven-dried 400 mL glass jar with a PTFE-coated, magnetic stir bar, compound (3a) (12.62 g, 22.0 mmol), and 250 mL of dry, degassed diethyl ether. Add chlorotrimethylsilane (6.2 mL, 48.5 mmol), and stir the mixture at 25° C. for 24 hours. Cool the mixture in the glove box freezer for 1 hour to precipitate compound (2a). Collect precipitated (2a) by filtration, and wash the filtercake with cold n-pentane. Dry the washed (2a) under reduced pressure to give 10.77 g (88.0% yield) of compound (2a), i.e., bis(2-(pentamethylphenylamido)ethyl)-amine zirconium(IV) dichloride, as a white powder. $^1$H NMR (400 MHz, Benzene-$d_6$) δ 3.40 (dt, 1H), 2.95 (dt, 1H), 2.59 (dp, 2H), 2.49 (s, 3H), 2.46 (s, 3H), 2.43-2.34 (m, 1H), 2.13 (s, 3H), 2.06 (s, 3H), 2.04 (s, 3H). $^{13}$C NMR (101 MHz, Benzene-$d_6$) δ 145.64, 133.37, 133.20, 132.61, 129.84, 129.57, 57.69, 48.97, 17.03, 17.01, 16.70, 16.47.

Inventive Example 3 (IE3): synthesis of compound (1A) (compound (1) wherein M is Zr and each R is CH$_2$Si(CH$_3$)$_3$) from compound (2a)

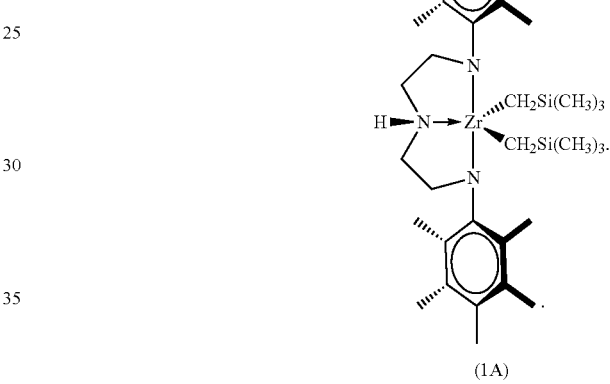

Under a nitrogen atmosphere in a glovebox, charge an oven-dried 400 mL glass jar with a PTFE-coated, magnetic stir bar, compound (2a) (5.0 g, 9.0 mmol), and 250 mL of dry, degassed toluene. Add a 1.0 M solution of trimethylsilylmethylmagnesium chloride in hexane, and stir the reaction mixture at 25° C. for 23 hours. Quench the reaction mixture with 2 mL of 1,4-dioxane, then filter the quenched mixture through diatomaceous earth. Concentrate the filtrate under reduced pressure. Triturate the residue concentrate in 20 mL of hexane, and dry the remaining triturated material under reduced pressure. Repeat the trituration/drying two times. Slurry the resulting pale orange solid in 200 mL of hexane, and place the slurry in the globe box freezer for several hours. Filter off the resulting fine precipitate through diatomaceous earth, then concentrate the filtrate under reduced pressure, and dry under vacuum to give compound (1A) as a pale orange powder. Compound (1A) is bis(2-(pentamethylphenylamido)ethyl)-amine zirconium(IV) bis-trimethylsilylmethyl. Repeat the procedure of IE3 two times to give a combined 14.2 g (average yield 79.8% over three runs) of compound (1A). $^1$H NMR (400 MHz, Benzene-$d_6$) δ 3.38 (dt, J=12.6, 5.4 Hz, 2H), 3.14 (ddd, J=12.3, 6.7, 5.3 Hz, 2H), 2.69-2.62 (m, 3H), 2.60 (s, 8H), 2.44 (s, 6H), 2.22 (s, 6H), 2.17 (s, 6H), 2.10 (s, 7H), 1.25-1.19 (m, 1H), 0.42-0.38 (m, 2H), 0.24 (s, 9H), −0.12 (s, 2H), −0.28 (s, 9H). $^{13}$C NMR (101 MHz, Benzene-$d_6$) δ 147.18, 133.07, 132.73, 130.97, 129.74, 129.67, 57.49, 55.96, 54.74, 48.29, 16.80, 16.70, 16.67, 16.37, 16.23, 3.40, 2.02. Measure the light-off performance according to the Light-Off Test Method and measure the according to the Solubility Test Method. Solubility and time to maximum temperature results are reported later in Table 1.

Inventive Example 4 (IE4): preparation of solutions of compound (1A) (compound (1) wherein M is Zr and each R is $CH_2Si(CH_3)_3$) in hexane. Dissolve measured quantities of compound (1A) in separate aliquots of hexane to give 700 mL of 0.91 wt % compound (1A) in hexane, 700 mL of 1.18 wt % compound (1A) in hexane, and 550 mL of 0.91 wt % compound (1A) in hexane, respectively. The solutions do not need to be chilled but may be transported or stored at 25° C.

Inventive Example 5 (IE5): preparation of a precatalyst formulation of compound (1A) in alkanes. Charge the three solutions of compound (1A) of IE4 to a 106 liter (L) capacity cylinder. Add 11.3 kilograms (kg) of high purity isopentane to the cylinder to give a precatalyst formulation of 0.10 wt % solution of compound (1A) in hexane/isopentane mixture. The precatalyst formulation of compound (1A) does not need to be chilled, but may be transported or stored at 25° C.

Inventive Example 6 (IE6): making unimodal catalyst system from compound (1A) and activator. Separately feed the activator formulation of Preparation 1B through a catalyst injection tube and feed freshly-prepared precatalyst system of IE5 through a different catalyst injection tube into an in-line mixer, wherein the contact each other to give the unimodal catalyst system, which then flows through an injection tube into the reactor.

Inventive Example 7 (IE7): making a bimodal catalyst system comprising a non-metallocene catalyst made from compound (1A) and a metallocene catalyst made from (MeCp)(1,3-dimethyl-4,5,6,7-tetrahydroindenyl)ZrMe$_2$, wherein Me is methyl, Cp is cyclopentadienyl, and MeCp is methylcyclopentadienyl. Separately feed the spray-dried metallocene with activator formulation of Preparation 2 through a catalyst injection tube and feed the precatalyst formulation of compound (1A) of IE5 through a different catalyst injection tube into an in-line mixer, wherein the feeds contact each other to form the catalyst system, which then flows through an injection tube into the reactor.

Inventive Example 8 (IE8): copolymerization of ethylene and 1-hexene using a unimodal catalyst system prepared from compound (1A) to make a unimodal poly(ethylene-co-1-hexene) copolymer. For each run, use a gas phase fluidized bed reactor that has a 0.35 m internal diameter and 2.3 m bed height and a fluidized bed primarily composed of polymer granules. Pass fluidization gas through the bed at a velocity of from 0.51 meter per second (m/s) to 0.58 m/s. Exit the fluidization gas from the top of the reactor, and pass the exited gas through a recycle gas line having a recycle gas compressor and heat exchanger before re-entering it into the reactor below a distribution grid. Maintain a constant fluidized bed temperature of 105° C. by continuously adjusting the temperature and/or flow rate of cooling water used for temperature control. Introduce gaseous feed streams of ethylene, nitrogen and hydrogen together with 1-hexene comonomer into the recycle gas line. Operate the reactor at a total pressure of 2410 kilopascals gauge (kPa gauge). Vent the reactor to a flare to control the total pressure. Adjust individual flow rates of ethylene, nitrogen, hydrogen and 1-hexene to maintain gas composition targets. Set ethylene partial pressure at 1.52 megapascal (MPa). Set the 1-hexene/ethylene ($C_6/C_2$) molar ratio to 0.0050 and the hydrogen/ethylene ($H_2/C_2$) molar ratio to 0.0020. Maintain ICA (isopentane) concentration at 8.5 to 9.5 mol %. Measure concentrations of all gasses using an on-line gas chromatograph. Feed freshly-prepared unimodal catalyst system of IE6 into the polymerization reactor at a rate sufficient to maintain a production rate of about 13 to 16 kg/hour poly(ethylene-co-1-hexene) copolymer, while also controlling feed rate to achieve a loading of 50 micromoles of zirconium per gram of spray dried solids. The poly(ethylene-co-1-hexene) copolymer ("resin") is characterized as unimodal molecular weight distribution, a high load melt index (HLMI or I21) of 0.21 g/10 minutes, a density of 0.9311 g/cm$^3$, a number-average molecular weight ($M_n$) of 79,727, a weight-average molecular weight ($M_w$) of 610,319, a z-average molecular weight (Mz) of 3,197,212, and a molecular weight distribution ($M_w/M_n$) of 7.66. IE8 makes a unimodal high molecular weight copolymer using a unimodal catalyst system comprising an activator formulation that does not comprise a precatalyst, and a precatalyst formulation comprising precatalyst (1) that does not contain activator. Resin particle size and particle size distribution data are shown later in Table 2.

Inventive Example 9 (IE9): copolymerization of ethylene and 1-hexene using a bimodal catalyst system prepared from compound (1A) and a metallocene to make a bimodal poly(ethylene-co-1-hexene) copolymer. Replicate the polymerization procedure of IE8 except instead of feeding the unimodal catalyst system of IE6 feed the bimodal catalyst system of IE7 into the reactor. Adjust the ratio of compound (1A) feed to spray-dried metallocene slurry to adjust the high load melt index (I21) of the bimodal poly (ethylene-co-1-hexene) copolymer in the reactor to approximately 6 g/10 minutes. Increase the C6/C2 molar ratio to 0.0060 to reduce the density of bimodal poly(ethylene-co-1-hexene) copolymer. Adjust the feed rate of the spray dried metallocene slurry and compound (1A) solution at a rate sufficient to maintain a production rate of about 13 to 16 kg/hour of the bimodal poly(ethylene-co-1-hexene) copolymer. The bimodal poly(ethylene-co-1-hexene) copolymer produced is bimodal, has an I21 of 6.1 g/10 minutes, a melt flow ratio (I21/I5) of 28.9, a density of 0.9476 g/cm$^3$, $M_n$ of 19,194, $M_w$ of 353,348, Mz of 2,920,833, and $M_w/M_n$ of 18.41. The bimodality of the bimodal poly(ethylene-co-1-hexene) copolymer of IE9 is illustrated by the GPC plot shown in FIG. 1. Resin particle size and particle size distribution data are shown later in Table 2.

Comparative Example 3 (CE3): copolymerization of ethylene and 1-hexene using a comparative unimodal catalyst system made with HN5Zr dibenzyl of CE2 in a spray-dried formulation with hydrophobic fumed silica and MAO to make a comparative unimodal poly(ethylene-co-1-hexene) copolymer. Replicate the procedure of IE8 except using the comparative unimodal catalyst system instead of the unimodal catalyst system of IE6. The comparative poly(ethylene-co-1-hexene) copolymer is characterized as unimodal molecular weight distribution, a high load melt index (HLMI or I21) of 0.20 g/10 minutes and a density of 0.9312 g/cm$^3$. Resin particle size and particle size distribution are shown later in Table 2.

TABLE 1 solubility in hexanes containing at least 60 wt % n-hexane and light-off performance in polymerization of 1-octene.

| Precatalyst | Solubility in Hexanes (wt %) | Light-off Performance (Time to Maximum (minutes) |
|---|---|---|
| HN5Zr dichloride (CE1) | Not measured | 5.2 |
| HN5Zr dibenzyl (CE2) | 0.03 | 78.6 |
| Compound (1A) | 23.3 | 1.3 |

Compound (1A) has a solubility of at least 23.3 weight percent in hexanes containing at least 60 weight percent n-hexane measured according to the Solubility Test Method. Unpredictably, the solubility of compound (1A) in hexanes is 700 to 800 times greater than the solubility of HN5Zr dibenzyl (CE2) in hexanes.

Compound (1A) has a time to maximum temperature of 1.3 minutes in the Light-Off Test Method. Unpredictably, the time to maximum temperature of compound (1A) is 4 times better than HN5Zr dichloride (CE1) and 60 to 61 times better than HN5Zr dibenzyl (CE2).

As illustrated by the data in Table 1, the compound (1) has significantly increased solubility in alkanes, which enables reduced complexity of transitions between catalyst systems, and has significantly greater light-off performance than those of comparative precatalyst HN5Zr dibenzyl, which can decrease distributor plate fouling in gas phase polymerization reactors. Thus, compound (1) solves the aforementioned problems of prior non-MCN precatalysts.

TABLE 2 resin average particle size and particle size distribution of IE8 and IE9.

| Particle Property | CE3 | IE8 | IE9 |
|---|---|---|---|
| APS (mm) | 0.071 | 2.3 | 1.1 |
| 2.00 mm (10 mesh) screen (wt %) | 41.2 | 66.52 | 13.30 |
| 1.00 mm (18 mesh) screen (wt %) | 35.5 | 30.98 | 33.19 |
| 0.500 mm (35 mesh) screen (wt %) | 15.3 | 2.08 | 31.85 |
| 0.250 mm (60 mesh) screen (wt %) | 6.0 | 0.24 | 16.82 |
| 0.125 mm (120 mesh) screen (wt %) | 1.7 | 0.10 | 4.31 |
| 0.074 mm (200 mesh) screen (wt %) | 0.3 | 0.10 | 0.53 |
| Bottom Catch Pan (wt %) | 0.1 | 0.00 | 0.00 |
| Fines (wt % of total) | 0.4 | 0.10 | 0.53 |

In Table 2, APS (mm) is average particle size in millimeters. As shown by the data in Table 2, the average particle size of the particles of the unimodal poly(ethylene-co-1-hexene) copolymer of IE8 is 32 times larger than the average particle size of the particles of the comparative unimodal poly(ethylene-co-1-hexene) copolymer of CE3. The average particle size of the particles of the inventive bimodal poly(ethylene-co-1-hexene) copolymer of IE9 is 15 times larger than the APS of the particles of the comparative unimodal poly(ethylene-co-1-hexene) copolymer of CE3.

In Table 2, the bottom catch pan collects any particles that pass through the 0.074 mm (200 mesh) screen. The percent fines is equal to the sum of the wt % of particles that are trapped by the 0.074 mm (200 mesh) screen plus the wt % of particles that pass through the 0.074 mm (200 mesh) screen and are collected in the bottom catch pan. The percent fines of the comparative unimodal poly(ethylene-co-1-hexene) copolymer of CE3 is 4 times greater than the percent fines of the inventive unimodal poly(ethylene-co-1-hexene) copolymer of IE8.

The invention claimed is:

1. A compound of formula (1):

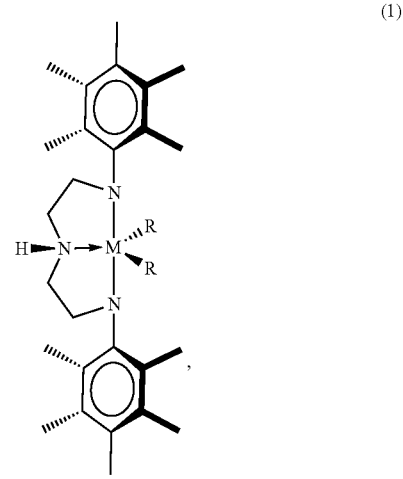

(1)

wherein M is Zr or Hf; one R independently is an unsubstituted or substituted quaternary-silahydrocarbyl group; and the other R is an unsubstituted or substituted quaternary-silahydrocarbyl group or an unsubstituted or substituted (aryl)alkyl group.

2. The compound of claim 1 wherein at least one R independently is an unsubstituted or substituted quaternary-silahydrocarbyl group of formula $-(C(R^A)_2)_m QSiR^1R^2R^3$, wherein subscript m is 1, 2, or 3; wherein each $R^A$ independently is H or $(C_1-C_3)$alkyl or each $R^A$ is bonded together as $R^{A'}-R^{A'}$, wherein $R^{A'}-R^{A'}$ is a $(C_1-C_3)$alkylene; each Q independently is absent, a $(C_1-C_3)$alkylene, or an unsubstituted or substituted phenylene; wherein each $R^1$, $R^2$, and $R^3$ is independently a $(C_1-C_{15})$alkyl that independently is unsubstituted or substituted with one or more substituents; and wherein each substituent independently is selected from unsubstituted $(C_1-C_5)$alkyl, halogen, —Oalkyl, —N(alkyl)$_2$, and —Si(alkyl)$_3$.

3. The compound of claim 1 wherein at least one R is independently —CH$_2$SiR$^1$R$^2$R$^3$; wherein each $R^1$, $R^2$, and $R^3$ is independently unsubstituted $(C_1-C_{15})$alkyl.

4. The compound of claim 1 wherein at least one R is —CH$_2$-(unsubstituted phenylene)-SiR$^1$R$^2$R$^3$; wherein each unsubstituted phenylene is unsubstituted 1,4-phenylene, unsubstituted 1,3-phenylene, or unsubstituted 1,2-phenylene; wherein each $R^1$, $R^2$, and $R^3$ is independently unsubstituted $(C_1-C_{15})$alkyl.

5. The compound of claim 1 wherein each R independently is CH$_2$Si(CH$_3$)$_3$ or CH$_2$-(phenylene)-SiR$^1$R$^2$R$^3$; and wherein (i) $R^1$ and $R^2$ are methyl, and $R^3$ is unsubstituted $(C_2-C_{15})$alkyl; or (ii) each of $R^1$, $R^2$, and $R^3$ is methyl.

6. The compound of claim 1 wherein one R is $CH_2Si(CH_3)_3$ or $CH_2$-(phenylene)-$SiR^1R^2R^3$; and wherein (i) $R^1$ and $R^2$ are methyl, and $R^3$ is unsubstituted $(C_2-C_{15})$alkyl, alternatively unsubstituted $(C_3-C_5)$alkyl; or (ii) each of $R^1$, $R^2$, and $R^3$ is methyl; and wherein the other R is a quaternary-alkyl substituted $(C_7-C_8)$arylalkyl group or an unsubstituted $(C_1-C_{15})$alkyl group.

7. The compound of claim 5 wherein the phenylene is (i) unsubstituted 1,4-phenylene; (ii) unsubstituted 1,3-phenylene; or (iii) unsubstituted 1,2-phenylene.

8. The compound of claim 1 wherein M is Zr.

9. The compound of claim 1 characterized by solubility in hexanes containing at least 60 weight percent n-hexane ($CH_3(CH_2)_4CH_3$) of at least 0.10 weight percent based on total weight of the compound and hexanes.

10. A compound of formula (1A):

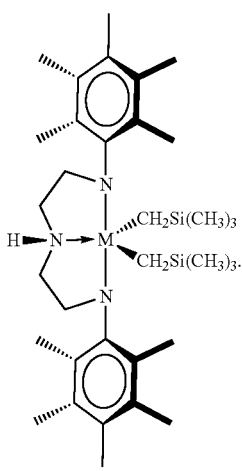

(1A)

11. A method of synthesizing the compound of formula (1) of claim 1, the method comprising contacting a compound of formula (2)

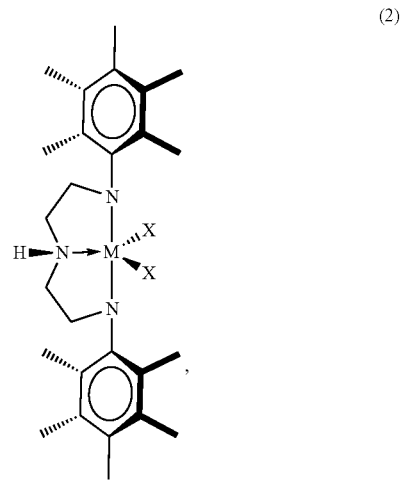

(2)

wherein M is as defined for compound (1) and each X independently is Cl, Br, or I, with an organometallic reagent of formula $X^1MgR$ or $M^1Rn$, wherein R is as defined for compound (1) of claim 1; $X^1$ is Cl, Br, or I; $M^1$ is selected from Li, Zn, Sn, and Cu; and subscript n is an integer from 1 to 4 and is equal to the formal oxidation state of $M^1$, in an aprotic solvent under effective reaction conditions, thereby synthesizing the compound of formula (1).

12. A solution of the compound of claim 1 in an alkane, wherein the solution is a liquid at 25 degrees Celsius and 101 kilopascals and the concentration of the compound in the solution is at least 0.10 weight percent based on weight of the solution.

13. A catalyst system comprising, or a product of an activation reaction of, a compound of claim 1, an activator, and optionally a support material.

14. The catalyst system of claim 13 further comprising a metallocene precatalyst, or a product of an activation reaction of the metallocene precatalyst and an activator.

15. A method of making a polyolefin polymer, the method comprising contacting the catalyst system of claim 13 with at least one olefin monomer selected from ethylene, propylene, a $(C_4-C_{20})$alpha-olefin, and 1,3-butadiene in a polymerization reactor under effective polymerization conditions, thereby making the polyolefin polymer.

* * * * *